United States Patent
Widmer et al.

(10) Patent No.: US 10,493,927 B1
(45) Date of Patent: Dec. 3, 2019

(54) MANAGED ROUTING AND ACTUATION HARNESS SYSTEM

(71) Applicant: GOODRICH CORPORATION, Charlotte, NC (US)

(72) Inventors: Jonathan L Widmer, Jud, ND (US); Wallace Harold Larson, Jamestown, ND (US); Dominic J Todd, Pelican Rapids, MN (US); Joshua Ryan Meidinger, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/022,299

(22) Filed: Jun. 28, 2018

(51) Int. Cl.
| | | |
|---|---|---|
| *B60R 16/02* | (2006.01) | |
| *H02G 3/34* | (2006.01) | |
| *B64D 9/00* | (2006.01) | |
| *B65G 13/06* | (2006.01) | |

(52) U.S. Cl.
CPC .......... *B60R 16/0215* (2013.01); *B64D 9/003* (2013.01); *H02G 3/34* (2013.01); *B64D 2009/006* (2013.01); *B65G 13/065* (2013.01)

(58) Field of Classification Search
CPC ...... B65G 13/065; H02G 3/34; H02G 3/0475; H02G 11/006; B64D 9/00; B64D 2009/006; F16G 13/16; F16L 3/015; H01B 7/0045
USPC ....................................................... 198/782
See application file for complete search history.

(56) References Cited

U.S. PATENT DOCUMENTS

| | | | | |
|---|---|---|---|---|
| 3,197,954 | A * | 8/1965 | Merker ................... | B66C 13/12 59/78.1 |
| 3,978,975 | A * | 9/1976 | Herbes ..................... | B64D 9/00 198/782 |
| 4,589,542 | A * | 5/1986 | Steadman ................ | B64D 9/00 198/782 |
| 5,101,962 | A * | 4/1992 | Pritchard ................. | B64C 1/20 198/369.4 |
| 5,547,069 | A * | 8/1996 | Pritchard ................. | B64D 9/00 198/782 |
| 6,708,480 | B1 * | 3/2004 | Wehler .................... | F16G 13/16 248/49 |
| 6,941,974 | B2 * | 9/2005 | Utaki ................... | H02G 11/006 138/110 |
| 7,673,738 | B2 * | 3/2010 | McConnell .............. | B60P 1/52 198/782 |
| 7,717,252 | B2 * | 5/2010 | Stewart ................... | B64D 9/00 193/35 SS |
| 9,669,747 | B2 | 6/2017 | Turba | |
| 9,885,429 | B2 * | 2/2018 | Stadler ................... | F16L 3/015 |
| 2017/0267191 | A1 | 9/2017 | Chambosse | |

* cited by examiner

*Primary Examiner* — William R Harp
(74) *Attorney, Agent, or Firm* — Snell & Wilmer, L.L.P.

(57) ABSTRACT

A harness system for a power drive unit is disclosed. In various embodiments, the harness system includes an electrical cable having a first end and a second end, a plurality of cover members positioned along a length of the cable and a spring member positioned adjacent the plurality of cover members along the length of the cable.

13 Claims, 6 Drawing Sheets

MANAGED ROUTING AND ACTUATION HARNESS SYSTEM

FIELD

The present disclosure relates generally to cargo power drive units and, more particularly, to steerable cargo power drive units having a managed routing and access harness system.

BACKGROUND

Items shipped by air typically are loaded first onto specially configured pallets or into specially configured containers. In the airfreight industry, such pallets and containers are commonly referred to as Unit Load Devices ("ULDs"). ULDs are available in various sizes, shapes and capacities and are typically loaded with cargo at locations other than the immediate vicinity of an aircraft. Once a ULD is loaded with cargo, the ULD is weighed, transferred to the aircraft and loaded onto the aircraft through a doorway or hatch using a conveyor ramp, scissor lift or the like. Once inside the aircraft, a ULD is moved within the cargo compartment to its final stowage position. Multiple ULDs are brought onboard the aircraft and each is placed in its respective stowed position. Once the aircraft reaches its destination, the ULDs are unloaded from the aircraft in a manner that is the reverse of the loading procedure.

To facilitate movement of a ULD within an aircraft cargo compartment, the deck of an aircraft cargo compartment typically includes a number of raised roller elements. These roller elements often include elongated roller trays that extend longitudinally along the length of the cargo deck. The ULDs sit atop these roller elements, and the roller elements facilitate rolling movement of the ULDs within the cargo compartment. Cargo decks are also commonly equipped with a plurality of power drive units ("PDUs"). PDUs are electrically powered rollers that can be selectively energized to propel or drive a ULD in a desired direction over the roller elements of a cargo deck.

Generally, PDUs can be one of two basic types, fixed or steerable. A fixed PDU is secured to a cargo deck structure such that the powered drive roller can only rotate in forward and aft directions within a cargo hold. Such fixed PDUs are typically installed at cargo deck locations remote from an aircraft cargo door, where movement of a ULD can be substantially limited to the forward and aft directions. A steerable PDU (sometimes referred to as a freighter common turntable or FCT) provides for additional directions of rotation of the drive roller. For example, the drive roller may be mounted to a rotatable frame or turntable that can be selectively oriented to align the drive roller in a desired direction within a cargo hold. Similar to a fixed PDU, a steerable PDU can be configured to lift and retract the drive roller between an active raised position and an inactive retracted position. Steerable PDUs are usually installed at cargo deck locations that are proximate to an aircraft cargo door, where a ULD may require movement in a direction other than the forward and aft directions as the ULD is being loaded or unloaded. Because the steerable PDU is configured to rotate within a confined, vertical space, consideration may be given to routing the electrical cabling within the PDU to save space and reduce the potential for inadvertent entanglement of the cabling or grounding of wires due to inadvertent wear.

SUMMARY

A harness system for a power drive unit is disclosed. In various embodiments, the harness system includes an electrical cable having a first end and a second end, a plurality of cover members positioned along a length of the cable and a spring member positioned adjacent the plurality of cover members along the length of the cable.

In various embodiments, at least one of the plurality of cover members includes a base side having a base side length and a tip side having a tip side length, the base side length being greater than the tip side length. In various embodiments, the tip side length is about twenty-five percent to about seventy-five percent of the base side length and, in various embodiments, the tip side length is about fifty percent of the base side length.

In various embodiments, at least one of the plurality of cover members includes a first aperture for receiving the cable and a second aperture for receiving the spring member. In various embodiments, the second aperture is positioned between the first aperture and the base side. In various embodiments, the spring member and the second aperture are rectangular in shape and have a side length that is about fifty percent to about one-hundred-fifty percent a diameter of the electrical cable.

In various embodiments, the harness system further includes a first electrical plug positioned at the first end of the electrical cable and a second electrical plug positioned at the second end of the electrical cable. In various embodiments, the harness system further includes a bracket configured for attachment to the power drive unit and to house a portion of the electrical cable proximate the second end of the electrical cable. In various embodiments, the bracket includes a first bracket-end having a slot configured for engagement with a mount secured to an underside of the power drive unit. In various embodiments, the bracket includes a second bracket-end and the second electrical plug is connected to the second bracket-end and configured to engage a second electrical receptacle positioned on the underside of the power drive unit. In various embodiments, the first electrical plug is configured to engage a first electrical receptacle positioned on a housing configured to receive the power drive unit. In various embodiments, the spring member is configured for attachment to the bracket.

A power drive unit is disclosed. In various embodiments, the power drive unit includes a drive roller, a drive motor configured to rotate the drive roller and a harness system configured to provide power to the drive motor, the harness system including an electrical cable having a first end and a second end, a plurality of cover members positioned along a length of the cable and a spring member positioned adjacent the plurality of cover members along the length of the cable.

In various embodiments, at least one of the plurality of cover members includes a base side having a base side length and a tip side having a tip side length and the base side length is greater than the tip side length. In various embodiments, at least one of the plurality of cover members includes a first aperture for receiving the cable and a second aperture for receiving the spring member. In various embodiments, the second aperture is positioned between the first aperture and the base side and the spring member and the second aperture are rectangular in shape and have a side length that is about fifty percent to about one-hundred-fifty percent a diameter of the electrical cable.

In various embodiments, the power drive unit further includes a bracket configured for attachment to the power drive unit and to house a portion of the electrical cable, the bracket including a first bracket-end configured for engagement to an underside of the power drive unit and a second bracket-end connected to an electrical plug configured to engage an electrical receptacle positioned on the underside of the power drive unit.

An aircraft cargo system is disclosed. In various embodiments, the aircraft cargo system includes a cargo deck and a power drive unit positioned within the cargo deck. In various embodiments, the power drive unit includes a drive roller, a drive motor configured to rotate the drive roller and a harness system configured to provide power to the drive motor, the harness system including an electrical cable having a first end and a second end, a plurality of cover members positioned along a length of the cable and a spring member positioned adjacent the plurality of cover members along the length of the cable.

In various embodiments, the power drive unit further includes a bracket configured for attachment to the power drive unit and to house a portion of the electrical cable, the bracket including a first bracket-end configured for engagement to an underside of the power drive unit and a second bracket-end connected to an electrical plug configured to engage an electrical receptacle positioned on the underside of the power drive unit.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
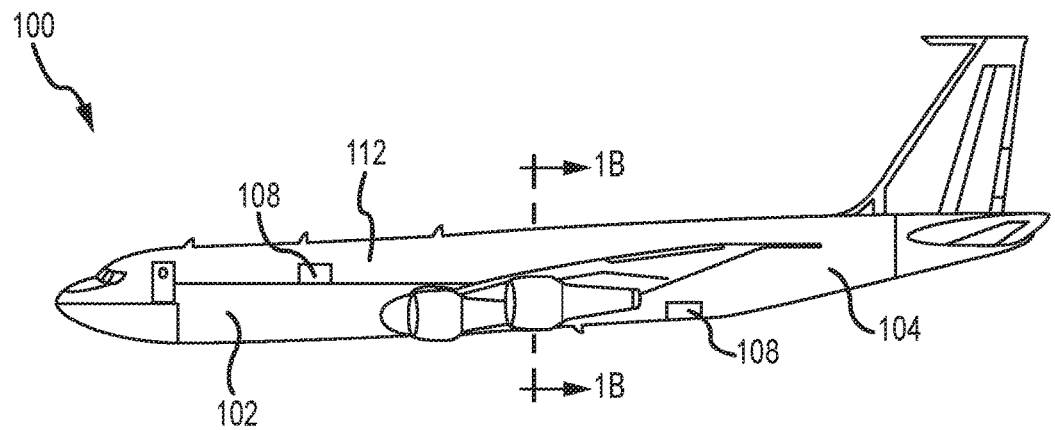
FIG. 1A is a schematic side view of an aircraft illustrating various cargo compartments, in accordance with various embodiments.
Figure 1B:
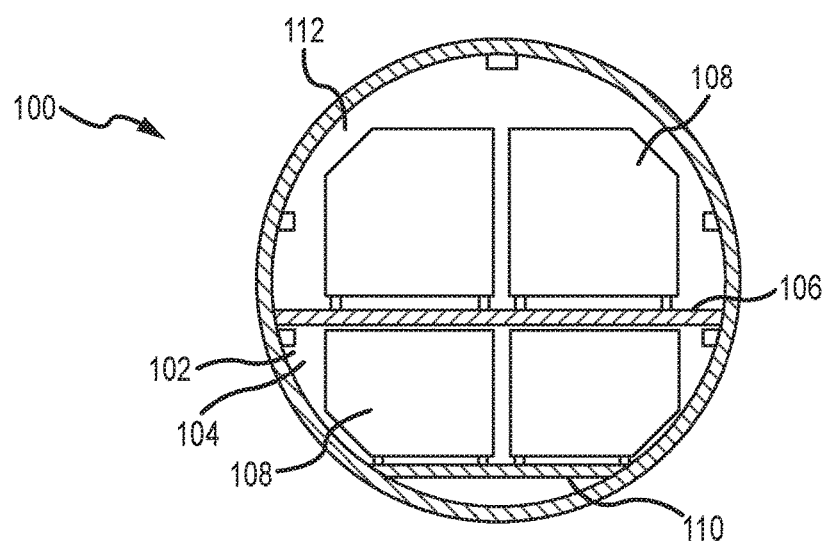
FIG. 1B is a schematic cross sectional view of the aircraft shown in FIG. 1A, in accordance with various embodiments.

Referring now to the drawings, FIGS. 1A and 1B schematically illustrate an aircraft 100 configured for carrying cargo and a cross sectional view thereof. As shown in FIGS. 1A and 1B, generally, the aircraft 100 may include a forward cargo compartment 102 and an aft cargo compartment 104 located below a main deck 106 of the aircraft. These cargo compartments are commonly referred to as the "forward lower lobe" and the "aft lower lobe," respectively and are configured to receive and store one or more ULDs 108 on a lower deck 110. In addition to the forward and aft lower lobes, the aircraft 100 may, in various embodiments, be equipped to receive and stow one or more ULDs 108 on its main deck 106 in a main deck cargo compartment 112. The aircraft 100 may be loaded with ULDs of various types, shapes, and sizes.

Figure 2:
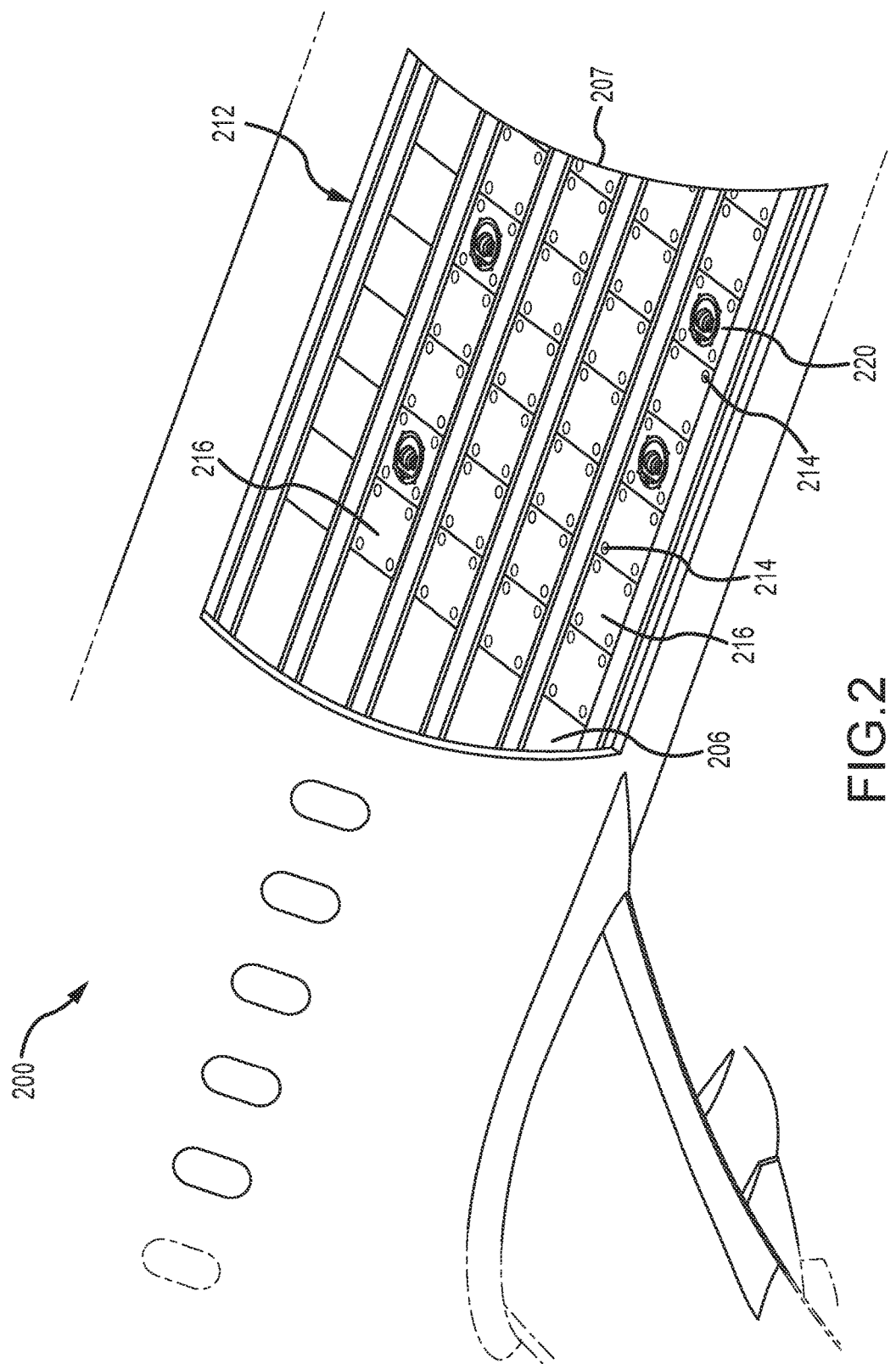
FIG. 2 is a schematic perspective view of an aircraft cargo bay, in accordance with various embodiments.

Referring now to FIG. 2, an aircraft 200 is illustrated having a main deck cargo compartment 212 and a main deck 206. A cargo door 207 provides access to the main deck cargo compartment 212 from outside the aircraft 200. To facilitate movement of a ULD within the main deck cargo compartment 212, as the ULD is loaded, stowed and unloaded, the main deck 206 of the main deck cargo compartment 212 typically includes a number of raised roller elements 214. The raised roller elements 214, in various embodiments, may be considered part of elongated roller trays 216 that extend longitudinally along a length of the main deck 206. The ULDs sit atop the raised roller elements 214, which facilitate rolling movement of the ULDs within the main deck cargo compartment 212. In various embodiments, the main deck cargo compartment 212 may be equipped with one or more power drive units 220. As described below, the one or more power drive units 220 are typically electrically powered rollers that can be selectively raised above the raised roller elements 214, and selectively energized to propel a ULD across a cargo deck in a desired direction.

Figure 3:
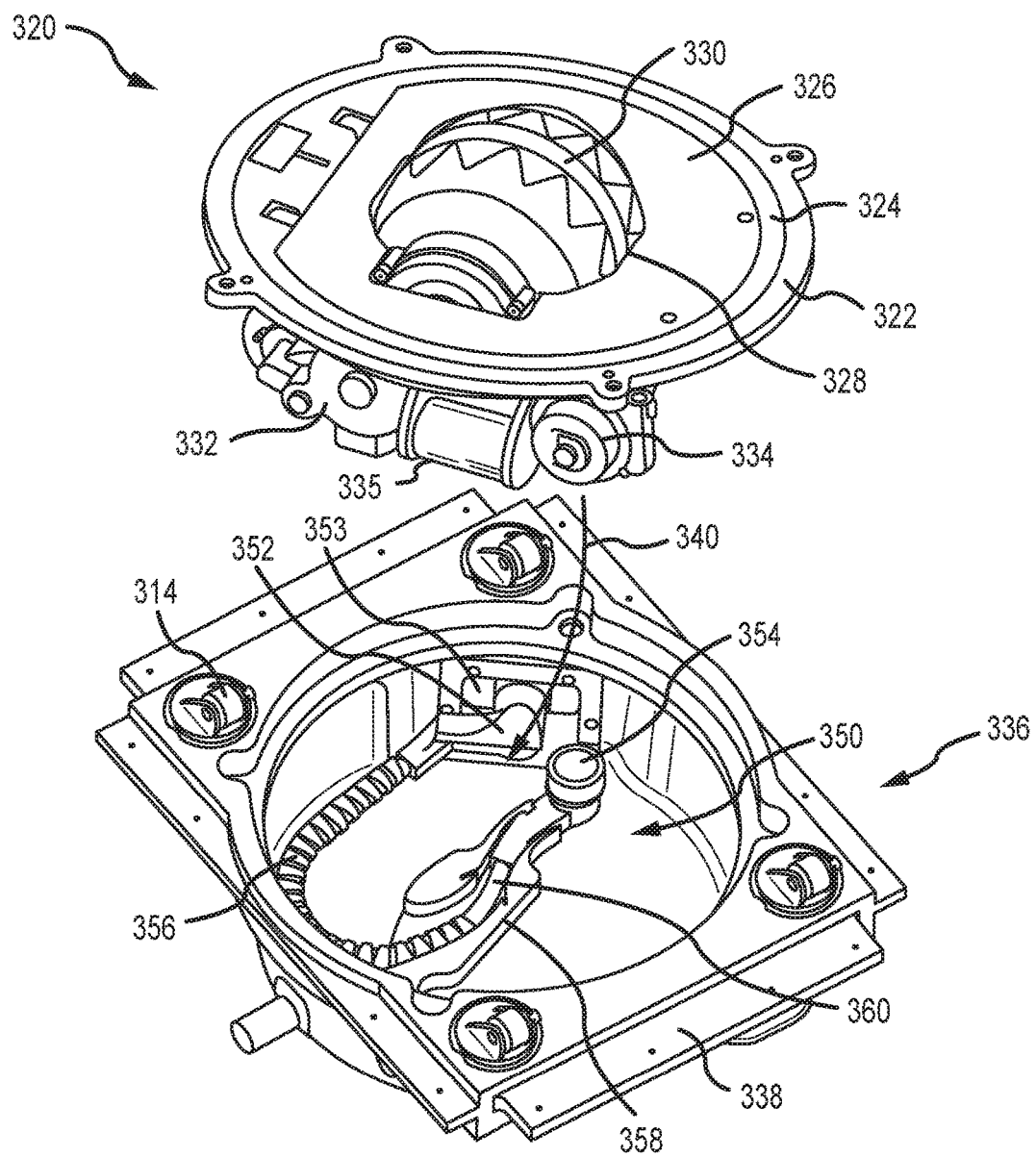
FIG. 3 is a schematic perspective view of a power drive unit having a harness system, in accordance with various embodiments.

Referring now to FIG. 3, a power drive unit 320 is illustrated, in accordance with various embodiments. A mounting ring 322 supports a rotatable frame or pivot plate 324. The pivot plate 324 may incorporate a removable cover 326, which includes an opening 328 that permits a drive roller 330 to extend upwardly to a raised active position— e.g., the drive roller 330 extends from a retracted position within the deck of an aircraft toward the ceiling of the aircraft such that at least a portion of drive roller 330 protrudes through the deck of the aircraft. The power drive unit 320 also includes a drive motor 332, a lift actuator 334 and a rotate actuator 335. The drive motor 332 rotates the drive roller 330 in either direction (e.g., forward or reverse), the lift actuator 334 raises and lowers the drive roller 330 with respect to the removable cover 326 and the rotate actuator 335 rotates the pivot plate 324 (and hence the drive roller 330) with respect to the mounting ring 322. In various embodiments, a housing 336 provides a structure to which the mounting ring 322 of the power drive unit 320 may attach. The housing 336 may include tabs 338 that may be used to mount the housing 336 to the deck of an aircraft cargo compartment, such as, for example, the main deck 206 of the main deck cargo compartment 212 described above with reference to FIG. 2. The housing 336 also provides structure to which one or more raised roller elements 314 may be attached, such as, for example, the raised roller elements 214 described above with reference to FIG. 2. In various embodiments, the mounting ring 322, which has attached thereto the various components above described, including the drive roller 330 and drive motor 332, is lowered into the housing 336, as indicated by the arrow 340, and secured thereto.

Still referring to FIG. 3, a harness system 350 is illustrated within the housing 336. In various embodiments, the harness system 350 includes a first electrical plug 352, configured to attach to the housing 336 via a first electrical receptacle 353. The first electrical plug 352 receives various power inputs from a power supply and control module that are configured to power the drive motor 332, the lift actuator 334 and the rotate actuator 335. In various embodiments, the harness system 350 also includes a second electrical plug 354, configured to attach to a second electrical receptacle mounted proximate an underside portion of the mounting ring 322 of the power drive unit 320. The second electrical plug 354 receives the power inputs from the first electrical plug 352 and conveys them to the drive motor 332, the lift actuator 334 and the rotate actuator 335 via wiring internal to the power drive unit 320. A flexible harness 356 connects the first electrical plug 352 to the second electrical plug 354. A bracket 358 is configured for attachment to the second electrical plug 354 and provides a protective sheath or routing mechanism for a first portion 360 of the flexible harness 356. As described below, the bracket 358 is also configured for attachment to the power drive unit 320 to facilitate controlled movement of the flexible harness 356 as the rotate actuator 335 rotates the pivot plate 324 (and hence the drive roller 330) with respect to the mounting ring 322 and the housing 336.

Figure 4B:
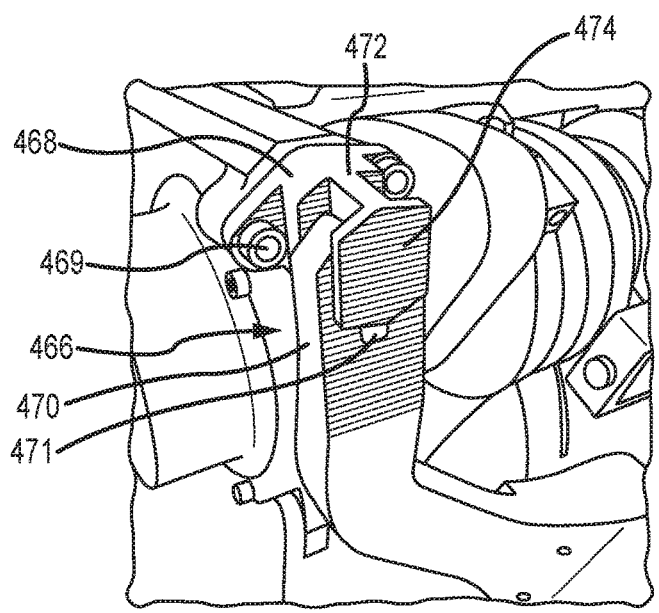
FIGS. 4A and 4B are schematic perspective views of an underside of a power drive unit having a harness system, in accordance with various embodiments.
Figure 4A:
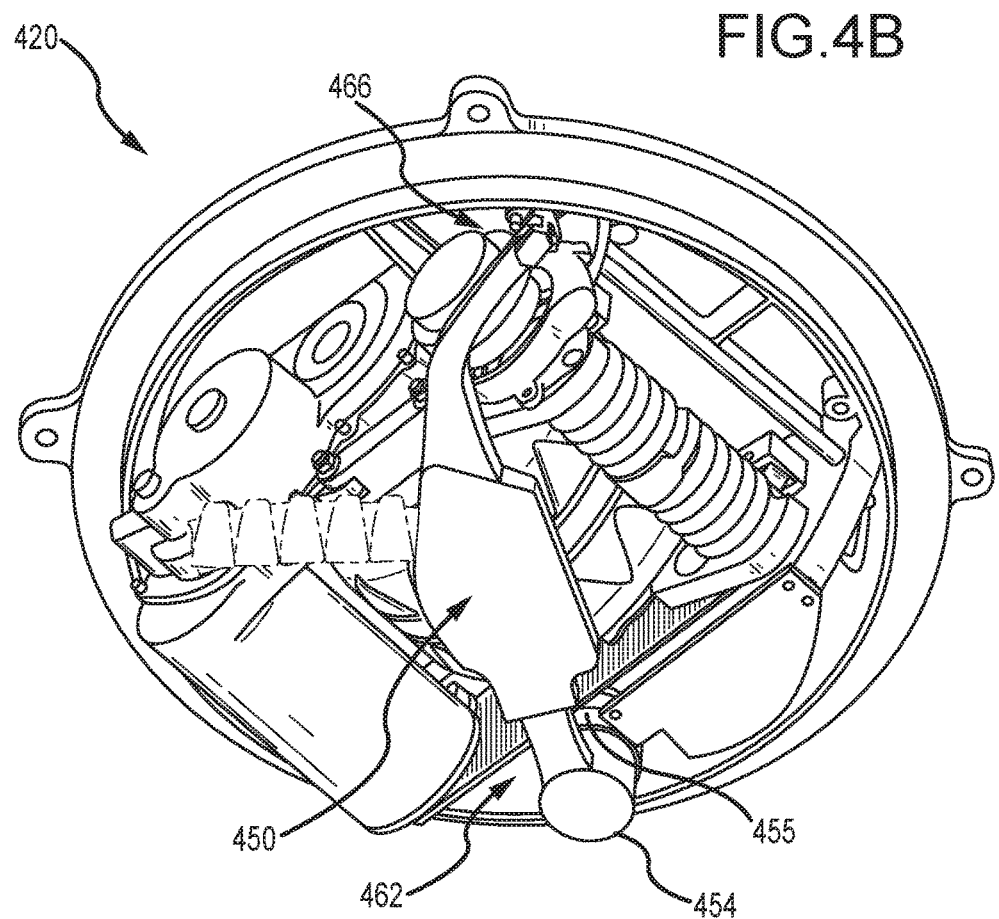

Referring now to FIGS. 4A and 4B, a power drive unit 420 is illustrated having a harness system 450 mounted thereto, in accordance with various embodiments. The harness system 450 includes a first end 466 configured for mounting to an underside of the power drive unit 420. In various embodiments, the first end 466 is configured to engage a mount 468 that is secured—e.g., via one or more bolts 469 or other fasteners—to a rotating portion of the underside of the power drive unit 420. For example, the first end 466 may include a base portion 470 and a slot 471 extending there through that is configured to engage the mount 468 via a tab member 472. A cover plate 474 extending from the tab member 472 may be employed to prevent the first end 466 from slipping off the tab member 472. In various embodiments, the first end 466 may incorporate the mount 468 as an integral component thereto—e.g., the mount 468 and the base portion 470 may comprise an integral, monolithic component configured to be secured to the underside of the power drive unit as above described—e.g., via the one or more bolts 469. Generally, the harness system 450 also includes a second end 462 that includes a second electrical plug 454, such as, for example, the second electrical plus 350 described above with reference to FIG. 3. In various embodiments, the second electrical plug 454 includes a plurality of electrical pins that fit snuggly into a corresponding plurality of holes that are housed within a second electrical receptacle 455. In various embodiments, the second electrical plug 454 and the second electrical receptacle 455 are configured to tightly engage each other so as not to separate during operation of the power drive unit 420. In various embodiments, the separate slot and tab configuration described above (i.e., the non-monolithic embodiment), in conjunction with the second electrical plug 454 and the second electrical receptacle 455, provides for fast removal, inspection and replacement of the harness system 450 from the power drive unit 420 without the need for undoing fasteners, such as, for example, screws or bolts.

Figure 5A:
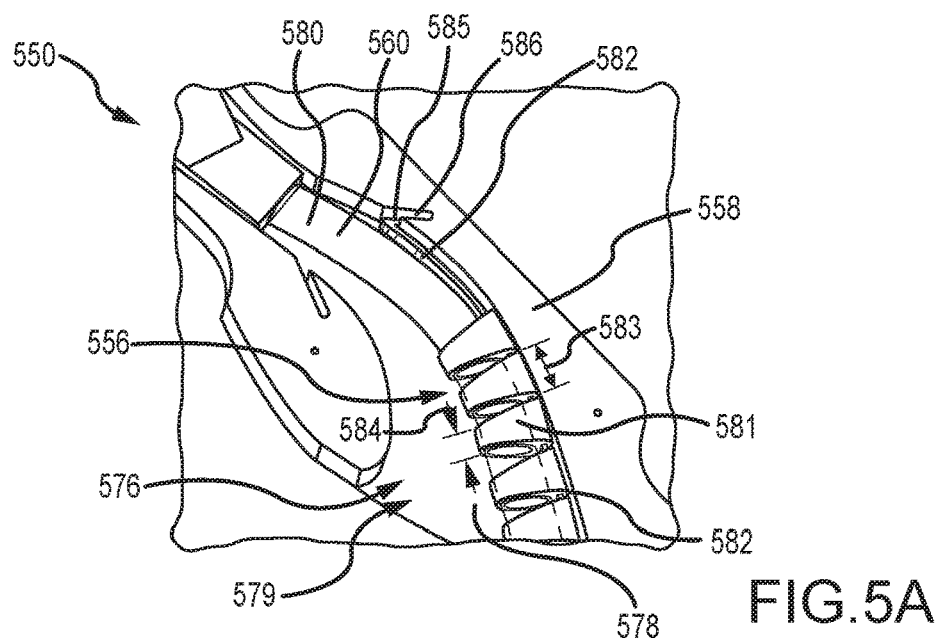
FIGS. 5A, 5B and 5C are schematic perspective views of a bracket and components of a harness system, in accordance with various embodiments.
Figure 5B:
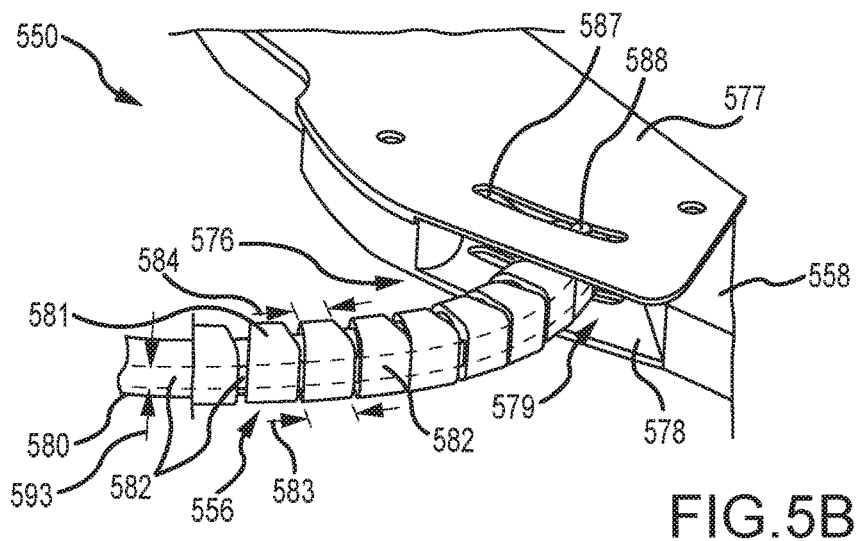
Figure 5C:
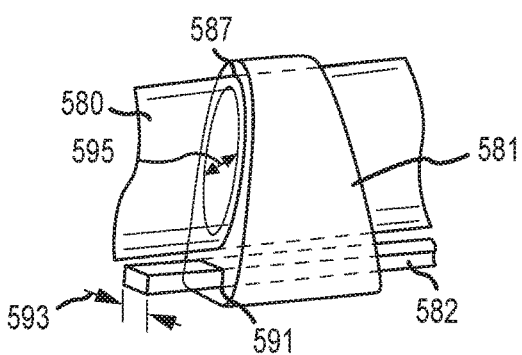

Referring now to FIGS. 5A, 5B and 5C, close-up views of a harness system 550 are illustrated. In various embodiments, the harness system 550 includes a bracket 558, similar to the bracket 358 described above with reference to FIG. 3. In various embodiments, the bracket 558 includes a hollow interior 576, that may be enclosed by a top plate 577 and a bottom plate 578, leaving an opening 579 available to thread a flexible harness 556 there through. The flexible harness 556 has a first portion 560 that is connected to a second electrical plug, such as, for example, the second electrical plug 354 described above with reference to FIG. 3. In various embodiments, the flexible harness 556 includes an electrical cable 580 surrounded by a plurality of cover members 581, each having a first aperture 591 for receiving the electrical cable 580, that are held together along a length of the electrical cable 580 by a spring member 582 that extends through a second aperture 589 extending through each of the cover members 581 and along the length of the electrical cable 580. In various embodiments, the cover members 581 may be constructed of plastic while the spring member 582 is constructed of semi-rigid metal, allowing the spring member 582 to flex in a plane of the bracket 558 but not otherwise. In various embodiments, each of the cover members 581 has a base side with a base side length 583 and a tip side, opposite the base side, with a tip side length 584, thereby enabling the flexible harness 556 to flex about the spring member 582 in a direction away from the base side and toward the tip side of each of the cover members 581 comprising the flexible harness 556. In various embodiments, the tip side length 584 is about ten percent (10%) to about ninety percent (90%) of the base side length 583; in various embodiments, the tip side length 584 is about twenty-five percent (25%) to about seventy-five percent (75%) of the base side length 583; and in various embodiments, the tip side length 584 is about fifty percent (50%) of the base side length 583. In various embodiments, the spring member 582 may be positioned on the base side of each of the cover members 581, rather than through an aperture in each of the cover members. In various embodiments, the spring member 582 is rectangular in shape, having a side length 593 that is about fifty percent (50%) to about one-hundred-fifty percent (150%) a diameter 595 of the electrical cable 580.

Still referring to FIGS. 5A, 5B and 5C, in various embodiments, the spring member 582 has an end attached to the bracket 558 via a clip portion 585 that has an end that bends backward on itself and is configured to be received in a slot 586 positioned within the bracket 558. The clip portion 585, when received in the slot 586, restricts the first portion 560 of the flexible harness from pulling away from the second electrical plug (e.g., the second electrical plug 454 described above with reference to FIG. 4A) and also restricts the flexible harness 556 to flex primarily in the plane of the bracket 558. As illustrated in FIG. 5B, in various embodiments, the top plate 577 and the bottom plate 578 may also include a guide slot 587 that is configured to receive a pin 588 that is secured to one of the cover members 581 proximate the guide slot 587. The guide slot 587 and pin 588 further restrict the flexible harness 556 to movement in the plane of the bracket 558 only during rotation of the bracket 558 with respect to a corresponding housing, such as, for example, the housing 336 described above with reference to FIG. 3.

Figure 6A:
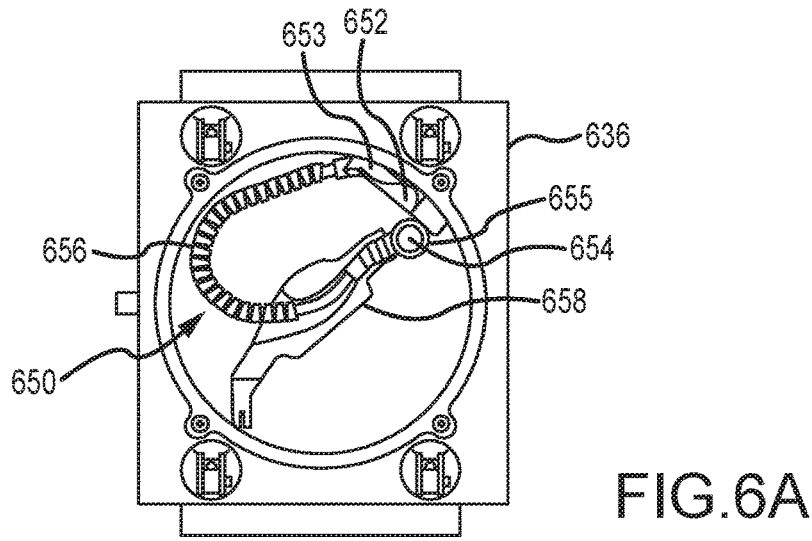
FIGS. 6A, 6B and 6C are schematic overhead views of a housing for a power drive unit, showing a harness system in different orientations, in accordance with various embodiments.
Figure 6B:
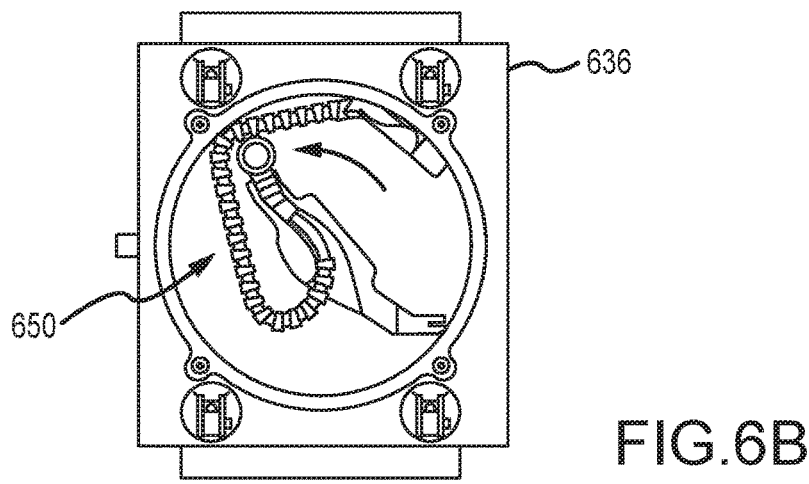
Figure 6C:
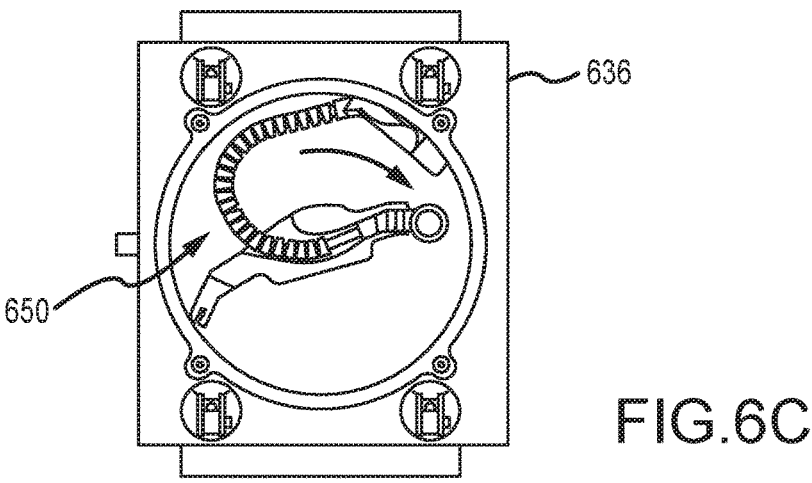

Referring now to FIGS. 6A, 6B and 6C, overhead views of a housing 636 for a power drive unit, showing a harness system 650 in different orientations, are provided in accordance with various embodiments. As illustrated in FIG. 6A, the harness system 650 includes a bracket 658, a first electrical plug 652 configured for engagement with a first electrical receptacle 653, a second electrical plug 654 configured for engagement with a second electrical receptacle 655, and flexible harness 656. In various embodiments, FIG. 6A depicts the harness system 650 in a position corresponding to forward and backward movement of a ULD with respect to an aircraft deck. In such case, a drive roller of a power drive device, such as, for example, the drive roller 330 of the power drive unit 320, described above with reference to FIG. 3, would be oriented to the fore and aft direction with respect to the aircraft deck. Referring to FIG. 6B, the harness system 650 is illustrated having been rotated counterclockwise, ninety degrees, from the position shown in FIG. 6A. In this case, the drive roller of a corresponding power drive device will be oriented such that movement of a ULD will be from side to side with respect to an aircraft deck. Similarly, referring to FIG. 6C, the harness system 650 is illustrated having been rotated clockwise, twenty-five degrees, from the position shown in FIG. 6A. In this case, the drive roller of a corresponding power drive device will be oriented such that movement of a ULD will be along a twenty-five degree angle with respect to an aircraft deck. In each case, and for all cases intermediate those illustrated in FIGS. 6A-6C, the harness system 650 will remain in the same plane, e.g., the plane of the bracket 658 as it rotates with a corresponding power drive unit. Further, any power cables being carried within the harness system 650 are constrained from being caught within moving or rotating components of the power drive unit and from inadvertent grounding against metallic components of the power drive unit.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching. Further, throughout the present disclosure, like reference numbers denote like elements. Accordingly, elements with element numbering may be shown in the figures, but may not necessarily be repeated herein for the sake of clarity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A harness system for a power drive unit, comprising:
   an electrical cable having a first end and a second end;
   a plurality of cover members positioned along a length of the electrical cable; and
   a spring member positioned adjacent the plurality of cover members along the length of the electrical cable,
      wherein at least one of the plurality of cover members includes a base side having a base side length and a tip side having a tip side length, the base side length being greater than the tip side length,
      wherein at least one of the plurality of cover members includes a first aperture for receiving the electrical cable and a second aperture for receiving the spring member and
      wherein the second aperture is positioned between the first aperture and the base side.

2. The harness system of claim 1, wherein the tip side length is about twenty-five percent to about seventy-five percent of the base side length.

3. The harness system of claim 2, wherein the tip side length is about fifty percent of the base side length.

4. The harness system of claim 1, wherein the spring member and the second aperture are rectangular in shape and have a side length that is about fifty percent to about one-hundred-fifty percent a diameter of the electrical cable.

5. The harness system of claim 1, further comprising a first electrical plug positioned at the first end of the electrical cable and a second electrical plug positioned at the second end of the electrical cable.

6. The harness system of claim 5, further comprising a bracket configured for attachment to the power drive unit and to house a portion of the electrical cable proximate the second end of the electrical cable.

7. The harness system of claim 6, wherein the bracket includes a first bracket-end having a slot configured for engagement with a mount secured to an underside of the power drive unit.

8. The harness system of claim 7, wherein the bracket includes a second bracket-end and wherein the second electrical plug is connected to the second bracket-end and configured to engage a second electrical receptacle positioned on the underside of the power drive unit.

9. The harness system of claim 8, wherein the first electrical plug is configured to engage a first electrical receptacle positioned on a housing configured to receive the power drive unit.

10. The harness system of claim 9, wherein the spring member is configured for attachment to the bracket.

11. A power drive unit, comprising:
    a drive roller;
    a drive motor configured to rotate the drive roller; and
    a harness system configured to provide power to the drive motor, the harness system comprising:
        an electrical cable having a first end and a second end;
        a plurality of cover members positioned along a length of the electrical cable; and
        a spring member positioned adjacent the plurality of cover members along the length of the electrical cable,
        wherein at least one of the plurality of cover members includes a base side having a base side length and a tip side having a tip side length, the base side length being greater than the tip side length,
        wherein at least one of the plurality of cover members includes a first aperture for receiving the electrical cable and a second aperture for receiving the spring member and
        wherein the second aperture is positioned between the first aperture and the base side and wherein the spring member and the second aperture are rectangular in shape and have a side length that is about fifty percent to about one-hundred-fifty percent a diameter of the electrical cable.

12. The power drive unit of claim 11, further comprising a bracket configured for attachment to the power drive unit and to house a portion of the electrical cable, wherein the bracket includes a first bracket-end configured for engagement to an underside of the power drive unit and wherein the bracket includes a second bracket-end connected to an electrical plug configured to engage an electrical receptacle positioned on the underside of the power drive unit.

13. An aircraft cargo system, comprising:
    a cargo deck; and
    a power drive unit positioned within the cargo deck, the power drive unit comprising:
        a drive roller;
        a drive motor configured to rotate the drive roller; and
        a harness system configured to provide power to the drive motor, the harness system comprising:
            an electrical cable having a first end and a second end;
            a plurality of cover members positioned along a length of the electrical cable; and
            a spring member positioned adjacent the plurality of cover members along the length of the electrical cable,
        wherein the power drive unit further comprises a bracket configured for attachment to the power drive unit and to house a portion of the electrical cable, the bracket including a first bracket-end configured for engagement to an underside of the power drive unit and a second bracket-end connected to an electrical plug configured to engage an electrical receptacle positioned on the underside of the power drive unit.

* * * * *